United States Patent
Burmester et al.

(10) Patent No.: US 8,192,777 B2
(45) Date of Patent: Jun. 5, 2012

(54) PROCESS FOR PRODUCING FROZEN CONFECTIONERY PRODUCTS

(75) Inventors: Sabina Silvia Haenel Burmester, Sharnbrook (GB); Rui António Matias Soares, Santa Iria de Azóia (PT); Vito Antonio Tricarico, Rome (IT)

(73) Assignee: Conopco Inc., Englewood Cliffs, NJ (US)

( * ) Notice: Subject to any disclaimer, the term of this patent is extended or adjusted under 35 U.S.C. 154(b) by 164 days.

(21) Appl. No.: 12/578,779

(22) Filed: Oct. 14, 2009

(65) Prior Publication Data
US 2010/0143560 A1 Jun. 10, 2010

(30) Foreign Application Priority Data
Oct. 17, 2008 (EP) .................................. 08166865

(51) Int. Cl.
| A23G 9/00 | (2006.01) |
| A23L 1/00 | (2006.01) |
| A23G 1/10 | (2006.01) |
| A23L 1/317 | (2006.01) |
| A23G 3/20 | (2006.01) |

(52) U.S. Cl. ........ 426/565; 426/100; 426/516; 426/518; 99/485

(58) Field of Classification Search .................. None
See application file for complete search history.

(56) References Cited

U.S. PATENT DOCUMENTS

| 3,974,300 A | * | 8/1976 | Roberts et al. ............... 426/565 |
| 4,251,201 A | | 2/1981 | Krysiak |
| 4,734,024 A | | 3/1988 | Tashiro |
| 2005/0233033 A1 | | 10/2005 | Marchon |

FOREIGN PATENT DOCUMENTS

| EP | 0373246 | | 6/1990 |
| EP | 0601194 | | 6/1994 |
| FR | 2695300 | | 3/1994 |
| GB | 2172541 | | 9/1986 |
| GB | 2172541 A | * | 9/1986 |
| WO | WO 03/053154 | | 7/2003 |
| WO | WO 03053154 A1 | * | 7/2003 |

OTHER PUBLICATIONS

European Search Report Application No. EP 08166865 dated Apr. 2, 2009.

* cited by examiner

*Primary Examiner* — Humera Sheikh
*Assistant Examiner* — Subbalakshmi Prakash
(74) *Attorney, Agent, or Firm* — Gerard J. McGowan, Jr.

(57) ABSTRACT

A process for producing a frozen confectionery product is provided, the process comprising: extruding a frozen confection from a nozzle; and cutting the extruded frozen confection with an iris cutter; characterized in that the iris cutter is cooled to a temperature below 10° C. An apparatus for operating the process is also provided.

11 Claims, 2 Drawing Sheets

PROCESS FOR PRODUCING FROZEN CONFECTIONERY PRODUCTS

TECHNICAL FIELD OF THE INVENTION

The present invention relates to a hygienic process and apparatus for producing frozen confectionery products using an iris cutter.

BACKGROUND TO THE INVENTION

Food products consisting of a core of filling inside a coating are well known. They can be produced by co-extruding the coating and filling, and then using an iris cutter or diaphragm to encapsulate the filling within the coating as the extrudate is portioned. Such iris cutters are described in U.S. Pat. No. 4,251,201 and U.S. Pat. No. 4,734,024. They typically comprise a number of moveable blades held within a casing or tray and which form an aperture of variable size. The aperture can be opened and closed by sliding or rotating the blades. This type of process is known for encapsulating fillings in various food products, such as dough, as described for example in U.S. Pat. No. 4,734,024. More recently, it has also been applied to produce frozen confections in US 2005/0233033.

However, we have found that further problems arise when an iris cutter designed principally for producing products with an outer layer of dough etc. is used to manufacture products with an outer layer of a frozen confection. Unlike the commonly used encapsulating materials, such as dough, frozen confections are liable to melt. Friction between the blades of the iris cutter causes local heating, which can melt small amounts of frozen confection. The melted frozen confection may then be dispersed onto and/or between the cutting blades where it can remain stagnant. Although the amount of frozen confection that is melted is small, so that the shape of the products is not noticeably affected, it can cause other problems. In particular, in a factory situation, it may not be possible to clean or replace the cutter during a production run of several hours or more. This can result in potential problems due to growth of micro-organisms on the residue of melted frozen confection which could contaminate the products. The present invention lies in the identification and solution of this problem.

BRIEF DESCRIPTION OF THE INVENTION

In a first aspect the present invention provides a process for producing a frozen confectionery product, the process comprising:
(a) extruding a frozen confection from a nozzle; and
(b) cutting the extruded frozen confection with an iris cutter;
characterised in that the iris cutter is cooled to a temperature below 10° C.

The "temperature of the cutter" refers to the temperature of all food contacting surfaces of the cutter. The temperature of a food contacting surface is measured by fixing a thermocouple onto the surface. The cooling reduces the rate of growth of micro-organisms so that the process can be operated for extended periods of time. Preferably the cutter is maintained at a temperature below 5° C., more preferably about 0° C. The lower the temperature, the less microbial growth takes place. However, the temperature should not be too low in order to avoid frozen confection freezing between the cutter blades and hindering their motion. Preferably the cutter is maintained at a temperature above −5° C.

In a second aspect the present invention provides an apparatus for producing a frozen confectionery product, the apparatus comprising: a nozzle for extruding a frozen confection; an iris cutter for cutting the extruded frozen confection; and means for cooling the iris cutter to a temperature of below 10° C.

Preferably cooling is achieved by locating the iris cutter in a chamber through which cold gas, preferably cold air which has been filtered and dehumidified, is circulated. Preferably the cold air is at a temperature of below −5° C., such as about −7° C. or −10° C. Surprisingly we have found that this provides sufficient cooling so that the process can be operated for an extended period of time, e.g. at least 8 hours, such as 24 or 48 hours, without the need to remove or clean the cutter. This method of cooling is sufficient to counteract heat generated by friction between the blades. Using cold air has the advantage of being more controllable than other sources of cooling, such as cryogenic gases. Moreover, this method of cooling requires only simple equipment, compared e.g. to directly cooling the cutter by circulating a refrigerated liquid (e.g. glycol) through channels within the cutter.

Preferably a tray is located underneath the cutter to collect melted frozen confection that drips off the blades.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6$^{th}$ Edition, R. T. Marshall, H. D. Goff and R. W. Hartel (2003), Kluwer Academic/Plenum Publishers.

The invention will now be further described by reference to the example, which is illustrative only and non-limiting, and the following figures wherein.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, milk ice and the like. Preferably the frozen confection is ice cream. The frozen confection may be manufactured by any suitable process, typically by preparing a mix of ingredients; then pasteurising and optionally homogenising the mix; and then freezing and optionally aerating the mix to produce the frozen confection. Preferably the frozen confection has an overrun of from 20% to 200%, more preferably from 50% to 150%. The frozen confection is preferably at a temperature of −7° C. or below at extrusion, more preferably below −10° C., most preferably about −15° C. The frozen confection can be provided at a suitable temperature by means of a low temperature screw extruder.

Preferably a filling is co-extruded with the frozen confection so that the product consists of a core of filling and a shell of frozen confection. The filling may be one or more solid inclusions, such as pieces of chocolate, fruit, nut, biscuit, cake, cookie, toffee, fudge, nougat, marshmallow, etc. Alternatively, the filling may be a liquid, such as chocolate or fruit sauce, syrup etc., optionally containing inclusions.

Figure 1:
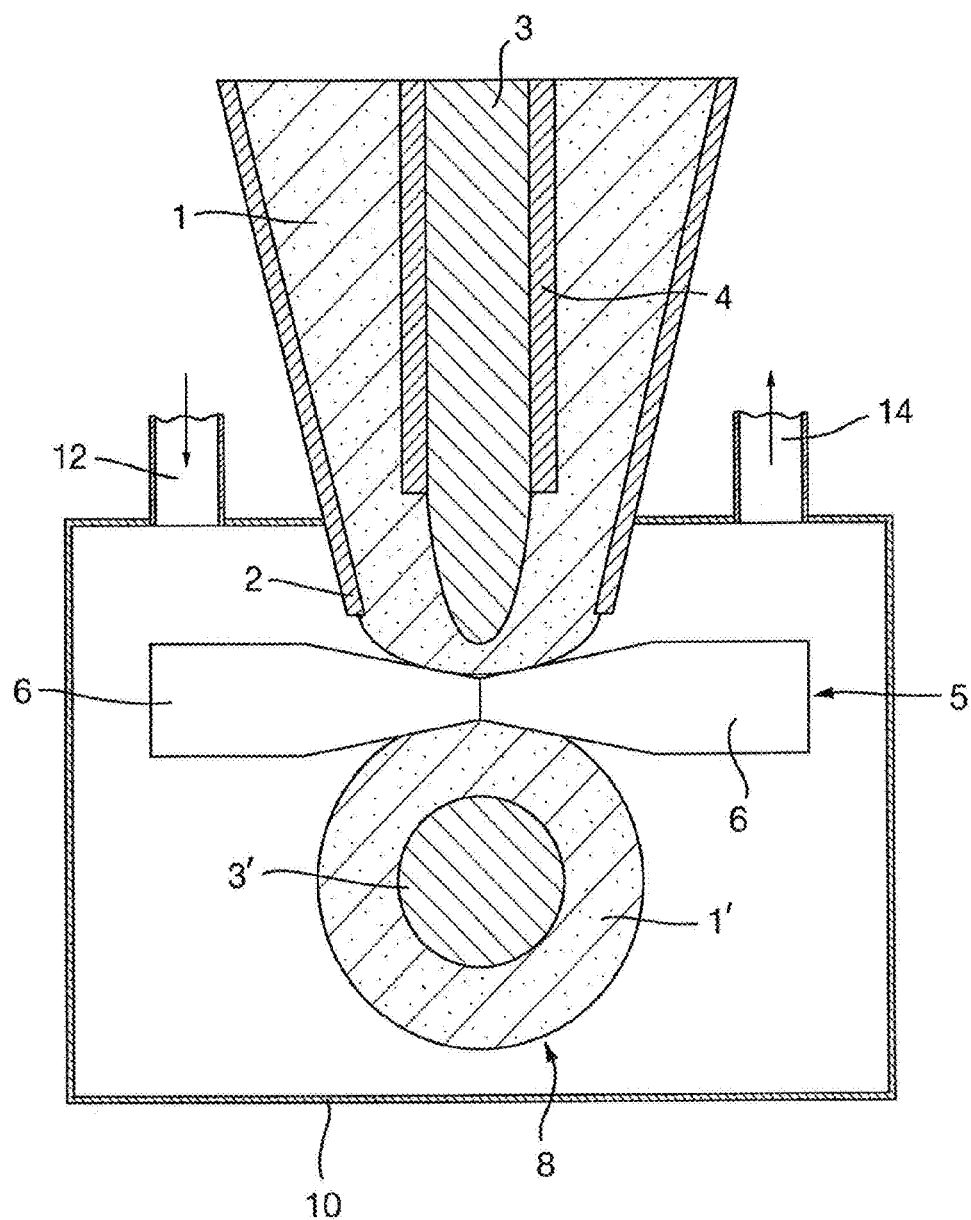
FIG. 1 is a cross-sectional view of a cutter and chamber demonstrating the process of the invention.

As shown in FIG. 1, the frozen confection 1 is supplied to the nozzle 2. The filling 3 is dispensed into the frozen confection 1 from a dispensing device 4 (in this case a second nozzle) located inside nozzle 2. The frozen confection 1 and filling 3 are co-extruded from the nozzle 2. The cross-sectional shape of this extrudate depends on the shape of the orifice of nozzle 2, which is typically circular, but may be of any suitable shape. The extrudate is then cut by an iris cutter 5 into individual products 8, in which the filling 3' is encapsulated in the frozen confection 1'. Typically the product has a volume of from 15 to 500 ml. The frozen confection and filling are preferably extruded continuously, so that multiple products are formed by repeatedly cutting the extruded stream. Finally, the products may be hardened, for example by blast freezing, and packaged.

The end of the nozzle 2 and the cutter 5 are enclosed within a chamber 10. The chamber 10 has an inlet 12 and an outlet 14 through which chilled air, typically at about −7° C. is passed in order to cool the cutter.

Figure 2:
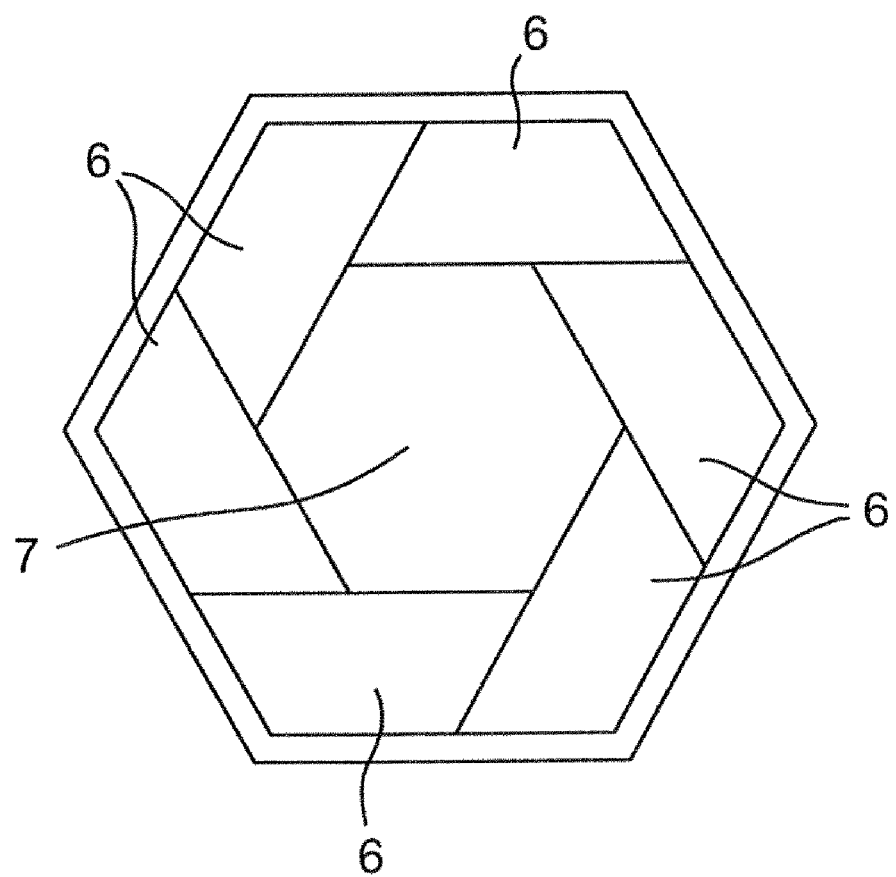
FIG. 2 is a top view of an iris cutter.

As shown in FIG. 2, the iris cutter may comprise a number of moveable blades 6 which form an aperture 7 of variable size. The aperture can be opened and closed by sliding the blades. At least three blades are normally used to form the aperture (in the cross-sectional view of FIG. 1 only two blades are visible). The greater the number of blades, the more closely circular is the aperture, so that preferably at least six blades are used. In profile the blades are typically tapered as shown in FIG. 1

A tray (not shown) may be placed underneath the cutter to collect melted frozen confection that drips off the blades and to prevent it from dripping onto the product. The tray preferably has a central hole large enough to allow the product to fall through after cutting. The tray may be tilted slightly (e.g. 2-10° from horizontal) so that the melted frozen confection drains out of it, and water may be trickled through to help drainage.

EXAMPLE

A standard ice cream mix was frozen to −6.5° C. and aerated to 100% overrun in an ice cream freezer. A standard chocolate sauce was cooled to −4° C. in an ice cream freezer but not aerated. The ice cream and sauce were fed to the outer and inner tubes of a co-extrusion nozzle, and after extrusion, the extrudate was cut and shaped by an iris cutter comprising six sliding blades.

The nozzle and cutter were located inside a refrigerated enclosed chamber with dimensions of height 50 mm, width 57 mm and depth 30 mm, constructed from polycarbonate sheets held in an aluminium frame. Air at approximately −7° C. was blown into the enclosed chamber from an air cooling unit (Zanotti, Model B GM 11702F) which produces 600 cubic metres of cold air per hour. The temperatures of the back of one cutter blade and of the cutter casing were measured using temperature probes. The temperature of the environment within the chamber was also measured. Temperatures were recorded with and without cooling over an 8 hour run (i.e. the typical length of a factory shift).

In the absence of cooling, the back of the cutter blade and the cutter casing reached steady temperatures of approximately 11° C. and 13° C. respectively. These are slightly lower than the temperature of the environment, measured to be 16° C., due to the cooling effect of the ice cream. Temperatures of 10° C. and above are unacceptable from a microbiological viewpoint if it is desired to operate the process for periods of 8 hours or more before cleaning the cutter. When the air cooling was switched on, the back of the cutter blade and the cutter casing both reached steady temperatures of approximately −2° C., and the temperature of the environment was measured to be around 0° C., i.e. temperatures at which little microbial growth can occur over a period of 8 hours.

Swabs were taken from locations on the cutter for microbiology testing at the start and end of the runs. The total viable counts from each swab are shown in Table 1.

TABLE 1

|  | No cooling | | −7° C. air cooling | |
| --- | --- | --- | --- | --- |
|  | Start | After 8 hours | Start | After 8 hours |
| Top surface of cutter blade | 3 | 56 | <1 | 5 |
| Bottom surface of cutter blade | 1 | 29 | <1 | 2 |
| Cutting surface of cutter blade | 1 | 24 | <1 | 1 |
| Top casing of iris cutter | 1 | >300 | <1 | 3 |

The initial counts were low for all locations in both runs. In the absence of cooling the number of counts increased significantly after 8 hours. In particular, the count from the swab taken from the iris cutter cover was unacceptably high (i.e. over 100). In contrast, when the cooling was used, very little microbial growth occurred. This data shows that the air cooling reduces the rate of microbial growth so that the cutter can be operated for at least 8 hours before it requires cleaning.

The various features and embodiments of the present invention, referred to in individual sections above apply, as appropriate, to other sections, mutatis mutandis. Consequently features specified in one section may be combined with features specified in other sections, as appropriate.

The invention claimed is:

1. A process for producing a frozen confectionery product, the process comprising:
   (a) extruding a frozen confection from a nozzle; and
   (b) cutting the extruded frozen confection with an iris cutter;
   wherein the iris cutter is located in a chamber through which gas at a temperature of below −5° C. is circulated, and the cutter is cooled to a temperature of 0° C. or below.

2. The process according to claim 1 wherein the cutter is at a temperature at about 0° C.

3. The process according to claim 1 wherein the gas is at a temperature of below −10° C.

4. The process according to claim 1 wherein the gas is air.

5. The process according to claim 1 wherein a tray is located underneath the cutter to collect melted frozen confection that drips off the blades.

6. The process according to claim 1 wherein the frozen confection is ice cream, sorbet, sherbet, frozen yoghurt, water ice or milk ice.

7. The process according to claim 1 wherein the frozen confection has an overrun of from 20 to 200%.

8. The process according to claim 1 wherein the frozen confection is co-extruded with a filling.

9. An apparatus for producing a frozen confectionery product, the apparatus comprising: a nozzle for extruding a frozen confection; an iris cutter for cutting the extruded frozen confection; and means for cooling the iris cutter to a temperature of 0° C. or below.

10. The process according to claim 1 where the cutter is cooled to a temperature between 0° C. and −5° C.

11. The process according to claim 1 wherein the cutter is cooled to a temperature of −2° C. or below.

* * * * *